United States Patent [19]

Oliva

[11] Patent Number: 5,330,137
[45] Date of Patent: Jul. 19, 1994

[54] APPARATUS AND METHOD FOR MOUNTING AN ELECTRICAL BOX BETWEEN STUDS IN A WALL

[76] Inventor: John H. Oliva, 875 New Bedford Pl., Fairfield, Calif. 94333-1400

[21] Appl. No.: 189

[22] Filed: Jan. 4, 1993

[51] Int. Cl.⁵ .............................................. G12B 9/00
[52] U.S. Cl. .................................. 248/27.1; 248/300; 248/906
[58] Field of Search .................. 248/300, 27.1, 906, 248/200.1

[56] References Cited

U.S. PATENT DOCUMENTS

| | | | |
|---|---|---|---|
| 1,288,024 | 12/1918 | Kendig | 248/906 X |
| 1,786,004 | 12/1930 | Clayton | 248/906 X |
| 1,790,031 | 1/1934 | Vaughn | 248/906 X |
| 1,933,358 | 10/1934 | Almarantz | 248/906 X |
| 1,982,957 | 12/1934 | Knell | 248/906 X |
| 2,032,636 | 3/1936 | Seckinger | 248/906 X |
| 2,223,910 | 12/1940 | Gallagher | 248/906 X |
| 2,440,324 | 4/1948 | Blakeslee | 248/906 X |
| 3,038,020 | 6/1962 | Winter et al. | 248/27.1 X |
| 3,659,037 | 4/1972 | MacDonald | 248/906 X |
| 3,917,899 | 11/1975 | Oliver | 248/27.1 X |
| 4,569,458 | 2/1986 | Horsley | 248/906 X |
| 4,757,967 | 7/1988 | Delmore et al. | 248/27.1 X |
| 4,964,525 | 10/1990 | Coffey et al. | 248/906 X |
| 4,967,990 | 11/1990 | Rinderer | |
| 5,005,792 | 4/1991 | Rinderer | 248/906 X |
| 5,114,105 | 5/1992 | Young | 248/906 X |

*Primary Examiner*—David A. Scherbel
*Assistant Examiner*—Derek J. Berger
*Attorney, Agent, or Firm*—Dennis S. Fernandez; Phuong K. Truong

[57] ABSTRACT

An improved apparatus and method for mounting an electrical box between studs in a wall is disclosed. The apparatus of the invention is a mounting bracket comprising a relatively flat, elongated frame having a front planar face, a rear planar face, and a first and second opposing ends attachable to two corresponding wall studs. The frame also has a central cut-out portion which defines a top edge and a bottom edge. An electrical box and its accompanying faceplate may be mounted between two wall studs by first attaching the bracket of the present invention to the wall studs. The open front end of the box is then placed flush against the rear face of the bracket such that a top portion of the box contacts the top edge of the bracket and a bottom portion of the box contacts the bottom edge of the bracket. Similarly, the accompanying faceplate is placed on the front face of the bracket opposite and aligned with the box such that a top portion of the faceplate contacts the top edge and a bottom portion of the faceplate contacts the bottom edge. The mounting is completed by fastening the box and the faceplate to the bracket. Mounted in this manner, the front end of the box will be substantially flush with the plane formed by the wall studs regardless of the depth of the box.

10 Claims, 4 Drawing Sheets

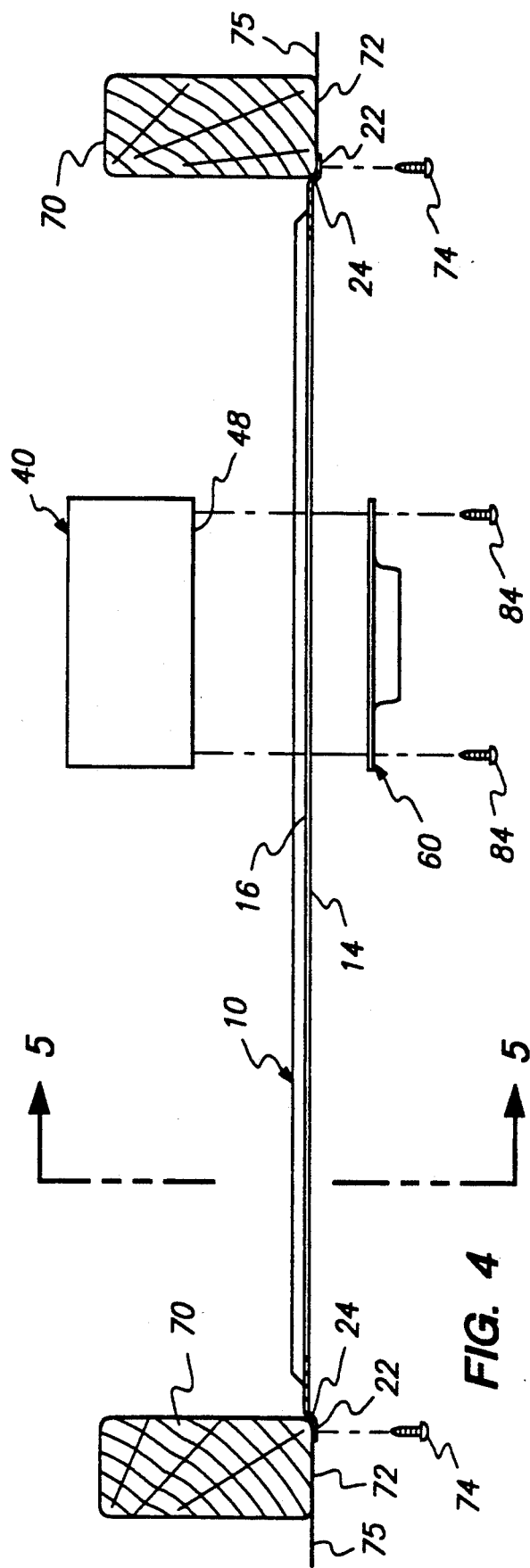
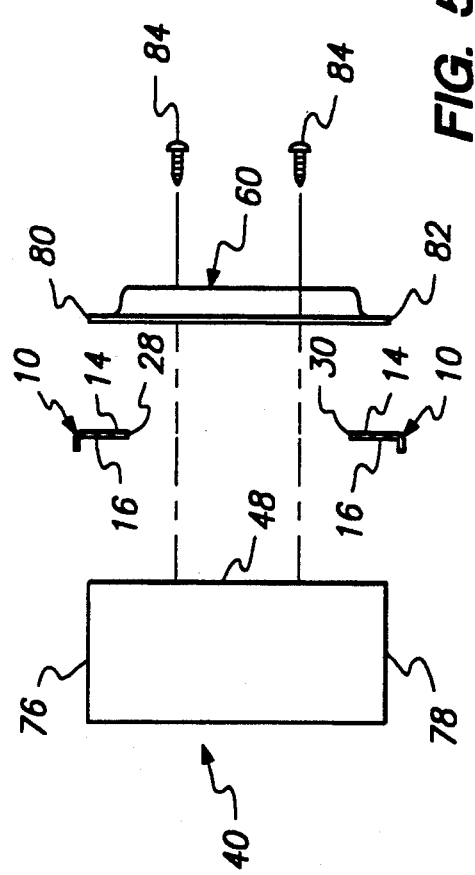
FIG. 4
FIG. 5

APPARATUS AND METHOD FOR MOUNTING AN ELECTRICAL BOX BETWEEN STUDS IN A WALL

FIELD OF THE INVENTION

This invention relates to mechanical brackets for mounting electrical boxes between studs in a wall and more specifically to a mounting bracket which allows boxes having different depths to be mounted on the same bracket.

BACKGROUND OF THE INVENTION

Brackets for mounting electrical boxes between wall studs are used on a daily basis in the construction industry. These brackets allow the builder to conveniently traverse the space between the studs and mount an electrical box at any location he chooses. A typical prior art bracket is disclosed in U.S. Pat. No. 4,967,990 issued to Rinderer. With reference to FIGS. 1 and 2 in Rinderer, the prior art bracket comprises a bar 21 attached at both ends to a respective wall stud S having a pair of integral elongate extensions 51 which set the bar back from the front of the studs S. The bar 21 also has a plurality of pilot holes 45 for accommodating the screws 13 for attaching the backwall of the electrical box B to the bar 21. Because the length of the bar 21 is several times the width of the electrical box, it can be used to mount a plurality of boxes.

In mounting bracket applications, it is desirable for the front of the electrical box B, after mounting, to be substantially flush with the front portions of the two studs. This is because a section of wall is set against the front of the two studs, and it is desirable for the front of the electrical box to be substantially flush with that section of wall. The prior art bracket 21 fulfills this requirement adequately when all of the boxes to be mounted on the bar have the same depth. However, when boxes of differing depths are to be mounted, the prior art bracket fails to provide satisfactory results. To illustrate, suppose that a second box, having a lesser depth than box B, is also mounted to the bar 21 shown in FIG. 2 of Rinderer. Because of its lesser depth, the front of the second box after attachment will not be flush with the wall between the studs S, but instead will be recessed from the wall. This is an undesirable result. Likewise, attaching a box having a larger depth than box B will cause the front of the box to extend beyond the wall between the studs S, and this also is an undesirable result. Because boxes of various depths are used regularly in the construction industry, it is important for a mounting bracket to be capable of accommodating boxes having different depths. The prior art bracket lacks this capability. Therefore, there exists a need for an improved apparatus and method for mounting electrical boxes between two studs in a wall.

SUMMARY OF THE INVENTION

The present invention is based on the observation that electrical boxes need not be mounted to a mounting bracket through their back walls but may instead be mounted with their open front ends flush with the mounting bracket. Mounted in this manner, the front of the box is always substantially flush with the wall between the studs, regardless of the depth of the box.

In accordance with this observation, the present invention provides an improved mounting bracket comprising a flat, elongated frame having a front planar face, a rear planar face, a first and a second opposing ends attachable to wall studs, and a central cut-out portion defining a top edge and a bottom edge. A portion of both the top and bottom edges are preferably bent at approximately a right angle with respect to the front face of the frame to provide improved structural rigidity. The frame also preferably has a plurality of bevelled rather than sharp corners. In addition, each of the opposing ends of the frame preferably includes a surface which is elevated above and substantially parallel to the front face of the frame.

In use, the bracket of the present invention preferably is attached between two wall studs with the front face of the frame substantially flush with the plane formed by the two studs. Once attached to the studs, the bracket may be used to mount at least one electrical box. The electrical box is preferably of conventional construction comprising a plurality of sides, a back end and an open front end. To mount the electrical box to the frame, the open front end of the box is placed flush against the rear face of the frame and positioned such that a top portion of the box contacts the top edge of the frame and a bottom portion of the box contacts the bottom edge of the frame. A faceplate associated with the box is placed against the front face of the frame opposite and in alignment with the electrical box and positioned in such a manner that a top portion of the faceplate contacts the top edge of the frame and a bottom portion contacts the bottom edge of the frame. To complete the mounting, the electrical box is fastened to the faceplate, preferably by means of a screw. Because the electrical box and the faceplate sandwich the frame, fastening the electrical box to the faceplate not only secures the box to the faceplate but also secures the box and the faceplate to the frame. The electrical box is thus mounted onto the frame. Note that after mounting, the front end of the box is flush with the frame. Because the frame itself is substantially flush with the wall between the studs, this means that the front end of the box is also substantially flush with the wall. This is true regardless of the depth of the box. Thus, the bracket of the present invention can accommodate boxes having different depths.

The bracket of the invention is a significant improvement over the bracket of the prior art. Because of its ability to accommodate electrical boxes having different depths, the bracket of the present invention gives the builder much greater flexibility and freedom. No longer is the builder forced to use the same depth of box on any particular mounting bracket. The present invention is also more cost effective than the prior art. The prior art bracket requires that once a deep box is used on any particular bracket, any other box mounted on that bracket must also be a deep box regardless of whether the added depth is needed. Using a deep box when only a shallow box is needed is certainly not cost effective. In contrast, the bracket of the present invention allows the builder to use any depth box he wishes. Thus, there is no need to waste a deep box when only a shallow one is needed. Therefore, the present invention eliminates the waste necessitated by the design of the prior art bracket. Overall, the present invention overcomes the shortcomings of the prior art and provides an improved apparatus and method for mounting electrical boxes between wall studs.

BRIEF DESCRIPTION OF THE DRAWINGS

FIG. 3b is a frontal view of a faceplate accompanying the electrical box shown in FIG. 3a.

FIG. 4 is a top cross-sectional view of the bracket of the present invention attached to two corresponding wall studs to illustrate the manner in which an electrical box may be mounted onto the bracket of the present invention.

FIG. 5 is a side cross-sectional view of the components shown in FIG. 4 taken along the line 5—5 in FIG. 4.

DETAILED DESCRIPTION OF THE PREFERRED EMBODIMENT

Figure 1:
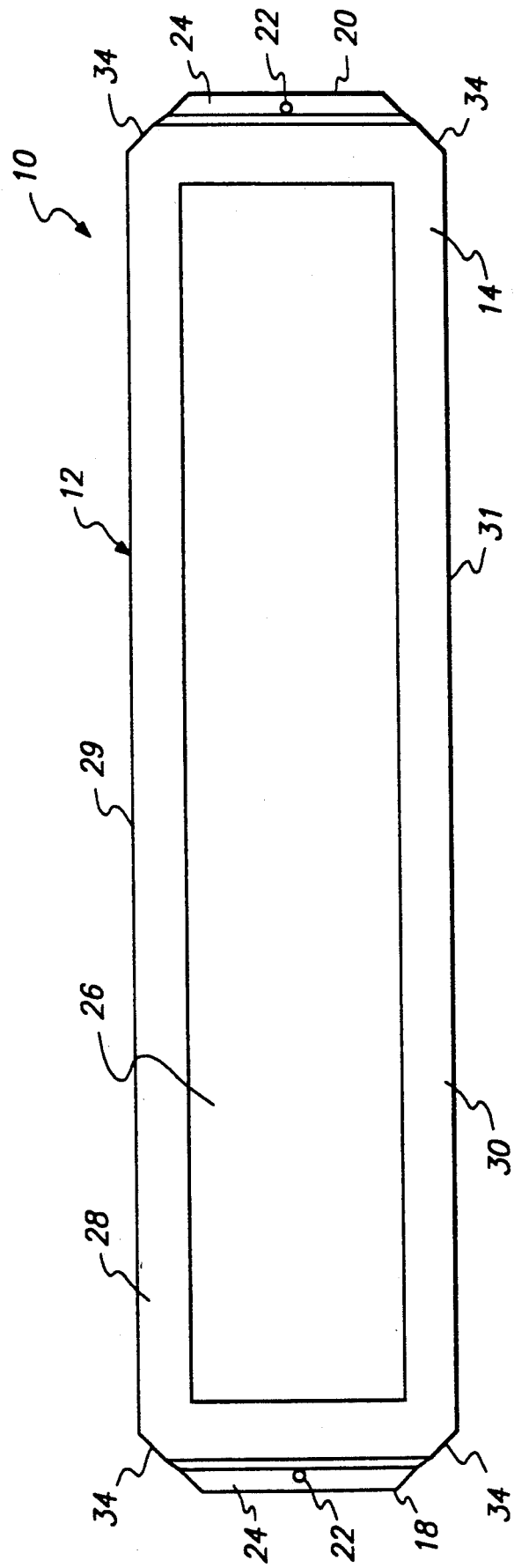
FIG. 1 is a frontal view of a preferred embodiment of the mounting bracket of the present invention.
Figure 2:
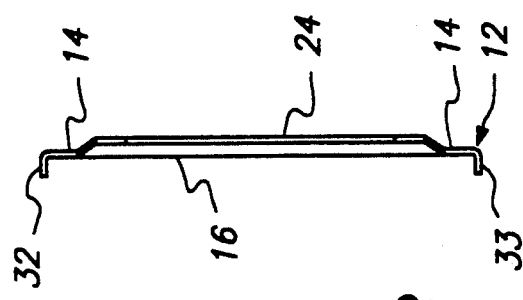
FIG. 2 is a side view of the mounting bracket shown in FIG. 1.

Referring to FIGS. 1 and 2, there are shown a frontal and a side view, respectively, of a preferred embodiment of the mounting bracket of the present invention, wherein the bracket 10 takes the form of a substantially flat and elongated frame 12. Frame 12 is preferably constructed of a relatively rigid and conductive material. The rigidity of the material provides the frame 12 with the necessary structural strength and the conductivity enables the frame 12 to function as an electrical ground. As an example, frame 12 may be constructed of 20 gauge galvanized sheet metal.

Frame 12 comprises a front planar face 14, a rear planar face 16 (FIG. 2), and a first 18 and second 20 opposing ends, each end preferably having a hole 22 therein for attaching the frame 12 to a corresponding wall stud (not shown). Each of the ends 18, 20 preferably has an attachable flat surface 24 which is bent upward from the body of the frame 12. The surface 24 is elevated above the front face 14 of the frame 12 and is substantially parallel thereto. This can be seen more clearly in FIG. 2, wherein the surface 24 is clearly shown to be elevated above the front face 14 of the frame 12. The distance by which the surface 24 is raised above the front face 14 is determined by the thickness of the faceplate (not shown) which is attached to the frame and the size of the head of the screw (not shown) which is used to attach the faceplate to the frame. Although this distance may vary depending upon the faceplate and the screw used, it is preferably about 0.5 centimeters. It is the surface 24 at each end of the frame 12 which is attached to a corresponding wall stud. Because wall studs are typically separated by a distance of either sixteen or twenty-four inches, the two elevated surfaces 24 are also preferably separated by either sixteen or twenty-four inches.

In the central part of the frame 12 is a substantial cut-out portion 26 which serves to define a top edge 28 and a bottom edge 30 in the frame. The cut-out portion 26 preferably has a height of between three and three and a half inches to ensure that it is no taller than a typical electrical box. To enhance the structural rigidity of the frame 12, the outer section 29 of the entire top edge 28 is preferably bent backward at substantially a right angle with respect to the front face 14 of the frame 12 to form a top lip 32 as shown in FIG. 2. Likewise, the outer section 31 of the entire bottom edge 30 is also preferably bent backward at substantially a right angle with respect to the front face 14 of the frame 12 to form a bottom lip 33. These lips 32, 33 impart to the frame an enhanced structural rigidity to resist both torsional forces and bending forces.

The frame 12 further comprises a plurality of bevelled corners 34 rather than sharp corners. These bevelled corners 34 allow nails to be driven into locations where the corners otherwise would have been. This is important because frame 12 is meant to be attached to wall studs. Since a large number of structures need to be attached to the studs, it is desirable to keep as much of the stud free as possible to accommodate the other structures. The bevelled corners 34 achieve this purpose.

Figure 3B:
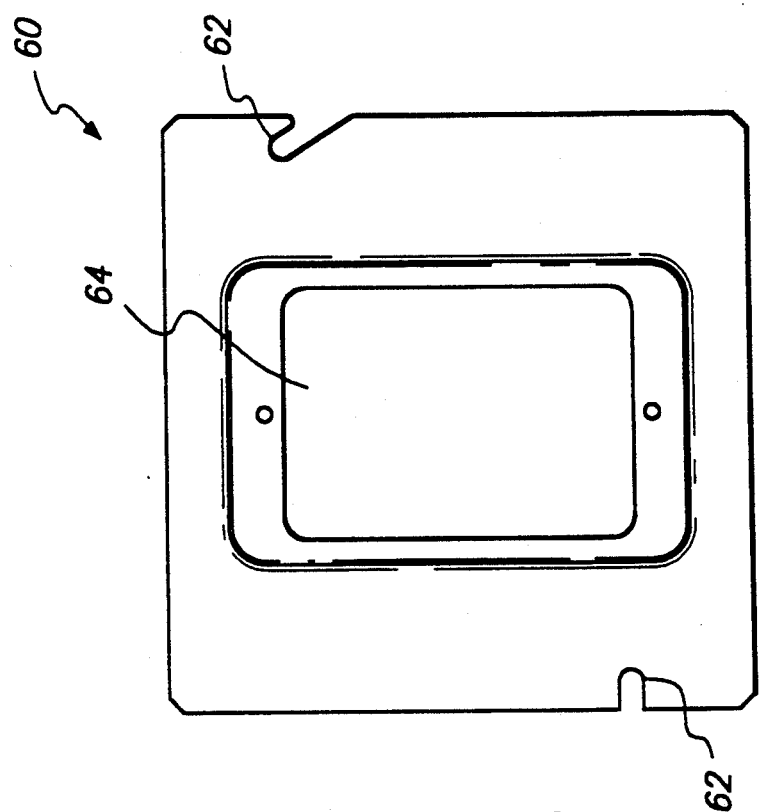
Figure 3A:
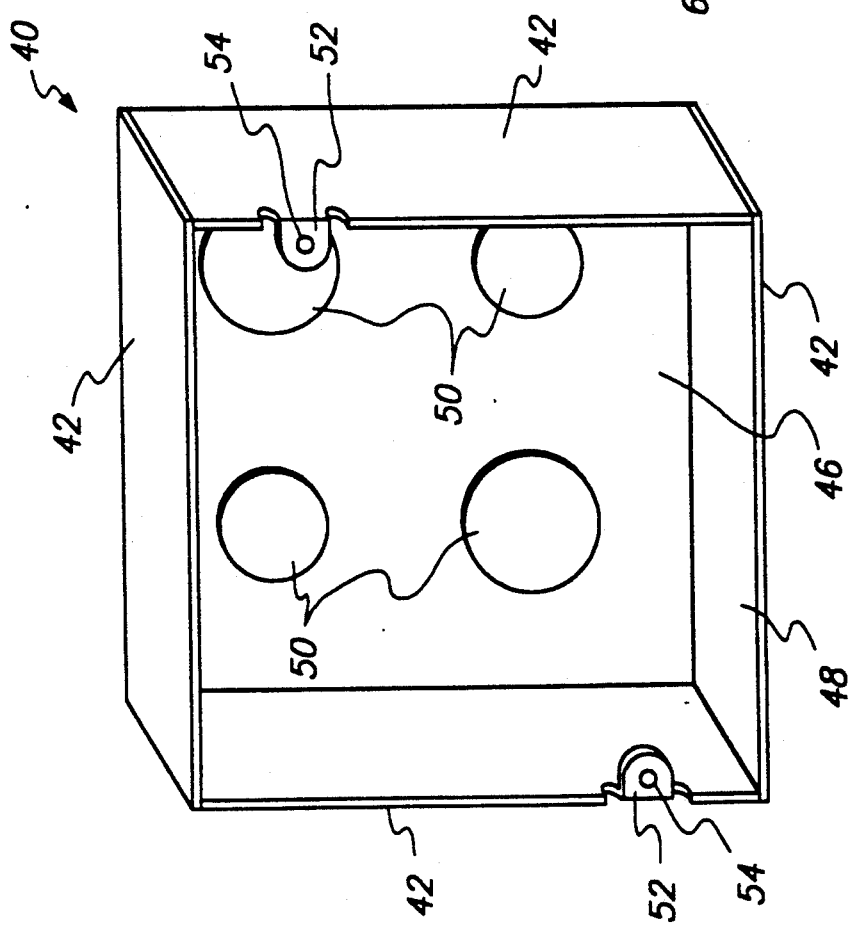
FIG. 3a is a perspective view of a typical electrical box which may be mounted onto the mounting bracket of the present invention.

The mounting bracket 10 of the present invention thus far described may be used to conveniently mount electrical boxes between two wall studs. A typical electrical box 40 which may be mounted to bracket 10, and an accompanying faceplate 60, are shown in FIGS. 3a and 3b, respectively. The electrical box 40 is preferably of standard construction comprising a plurality of sides 42 having a selected depth, a back end 46, and an open front end 48. The back end 46 typically has a plurality of pop-out sections 50 which may be removed to gain access into the interior of the box from the back end 46. The box further comprises two extensions 52 which extend from the sides 42 into the interior of the box 40, each extension 52 preferably having a threaded hole 54 therein for receiving a screw (not shown).

The accompanying faceplate 60 is also preferably of standard construction having two holes 62 and a central cut-out portion 64. The holes 62 are selectively located such that they are in alignment with the threaded holes 54 in the extensions 52 of the electrical box 40. Thus, screws may be inserted through holes 62 and driven into the threaded holes 54 of the box 40 to fasten the faceplate 60 to the electrical box 40. The cut-out portion 64 allows access to the interior of the box 40 after the faceplate 60 is attached to the box 40.

With reference to FIG. 4, which shows a top cross-sectional view of the bracket 10 of the present invention and two corresponding wall studs 70, the mounting of the electrical box 40 and its corresponding faceplate 60 will now be described. The bracket 10 is first attached to the studs 70 by placing each of the elevated surfaces 24 against the front face 72 of a corresponding wall stud 70, and inserting a screw 74 through the hole 22 in each surface 24 and driving the screw 74 into each of the studs 70 to secure the bracket 10 to the two studs 70. As attached, the front face 14 of the bracket 10 is substantially flush with the plane 75 formed by the front faces 72 of the two studs 70. After the bracket 10 is secured, the electrical box 40 is placed against the bracket 10 with the open front end 48 of the box 40 placed flush against the rear face 16 of the bracket 10. The faceplate 60 accompanying the box 40 is placed against the front face 14 of the bracket 10 opposite the electrical box 40. The faceplate 60 is aligned with the electric box 40 such that the holes 62 (FIG. 3b) in the faceplate 60 are aligned with the threaded holes 54 (FIG. 3a) in the extensions 52 from the box 40.

The positioning of the box 40 and the faceplate 60 in relation to the bracket 10 is best shown in FIG. 5, wherein a cross-sectional view, taken along line 5—5 in FIG. 4, is provided of the bracket 10, box 40, and faceplate 60. As shown in FIG. 5, when the front end 48 of the box 40 is placed against the rear face 16 of the bracket 10, a top portion 76 of the box 40 contacts the top edge 28 of the bracket 10, and a bottom portion 78 of the box 40 contacts the bottom edge 30 of the bracket 10. Similarly, when the faceplate 60 is placed against the front face 14 of the bracket, a top portion 80 of the faceplate 60 contacts the top edge 28 of the bracket, and a bottom portion 82 of the faceplate 60 contacts the bottom edge 30 of the bracket 10. Thus, when the box 40 and the faceplate 60 are in proper mounting position, they effectively sandwich the bracket 10 between them. To complete the mounting, screws 84 are inserted through the holes 62 (FIG. 3b) in the faceplate 60 and driven into the threaded holes 54 (FIG. 3a) in the extensions 52 from the electrical box 40 to fasten the box 40 to the faceplate 60. Because the box 40 and faceplate 60 sandwich the bracket 10, fastening the box 40 to the faceplate 60 also fastens the box 40 and faceplate 60 to the bracket 10. The electrical box 40 is thus mounted onto the bracket 10.

Preferably, the screws 84 do not go through either the top edge 28 or the bottom edge 30 of the bracket 10 but instead passes through the central cut-out portion 26 of the bracket 10. This obviates any need to drill holes into the bracket 10. Because the screws 84 pass through the central cut-out portion 26 and thus are not constrained by holes in the edges 28, 30, it is inherent that one may slide the box 40 and faceplate 60 along the length of the bracket 10 to place the box 40 and faceplate 60 at any desired position along the bracket 10. However, if desired, screws 84 may be driven through the edges 28, 30 of the bracket 10 without adversely affecting the function of the bracket 10. It should be noted at this point that the box 40 and faceplate 60 need not be secured to the bracket 10 by means of a screw. Variously other means such as bolts or rivets may be used for this purpose. In fact, the box 40 and faceplate 60 may be secured to the bracket 10 by gluing or even by welding. These and other means for securing the box 40 and the faceplate 60 to the bracket 10 are within the scope and spirit of the invention.

Figure 6:
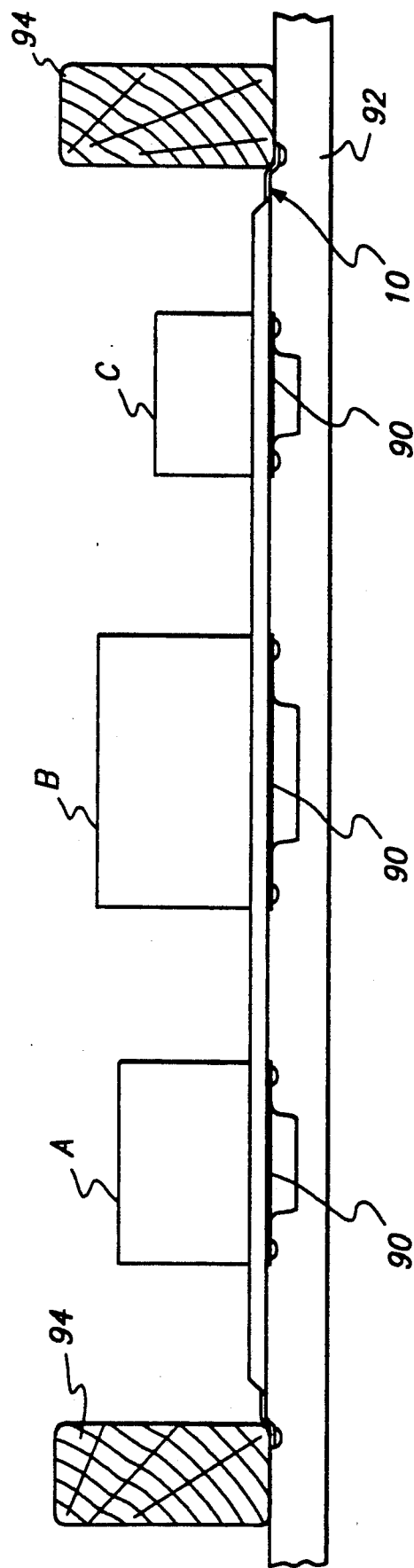
FIG. 6 is a top view of a bracket of the present invention, wherein the bracket has three electrical boxes, each having a different depth, attached thereto.

By repeating the mounting steps described above, a plurality of electrical boxes may be mounted onto a single bracket 10. A bracket 10 of the present invention having three electrical boxes mounted thereon is shown in FIG. 6, wherein a top view is provided of the bracket 10 and the three boxes A, B and C. As shown in FIG. 6, the three boxes A, B, C all have different depths. In particular, box B is deeper than box A and box C is shallower than box A. Despite their different depths, however, the front ends 90 of all three boxes A, B, C, after mounting to the bracket 10, are substantially flush with the wall 92 between the two studs 94. As discussed previously, this is the desired result. Therefore, the bracket of the present invention is capable of accommodating on the same bracket a plurality of boxes having different depths.

What is claimed is:

1. A mounting assembly for attachment between two wall studs, comprising:
    a flat elongated frame having a front planar face, a rear planar face, a first and second opposing ends attachable to said wall studs, and a central cut-out portion defining a top edge and a bottom edge, side top and bottom edges having no apertures therein for accommodating a fastener;
    an electrical box having a plurality of sides with a first depth, a back end, and an open front end, the front end of said box placed flush with the rear face of said frame with a portion of said box contacting said top edge and another portion of said box contacting said bottom edge;
    a faceplate placed on the front face of said frame opposite and in alignment with said electrical box, a portion of said faceplate contacting said top edge and another portion contacting said bottom edge; and
    a fastener inserted through said cut-out portion for fastening said electrical box to said faceplate, thereby attaching said box and said face plate to said frame.

2. The assembly of claim 1, further comprising:
    a second electrical box having a plurality of sides with a second depth different from the first depth, back end, and an open front end, the front end of said second box placed flush with the rear face of said frame with a portion of said second box contacting said top edge and another portion of said second box contacting said bottom edge;
    a second faceplate placed on the front face of said frame opposite and in alignment with said second electrical box, a portion of said second faceplate contacting said top edge and another portion of said second faceplate contacting said bottom edge; and
    a second fastener inserted through said cut-out portion for fastening said second electrical box to said second faceplate, thereby attaching said second box and said second faceplate to said frame.

3. The assembly of claim 1, wherein the electrical box has an extension with a first hole therein extending from one of said sides, wherein the faceplate has a second hole therein in alignment with said first hole, and wherein the fastener is inserted through said second hole, said cut-out portion, and said first hole to fasten the electrical box to the faceplate, thereby, attaching the electrical box and the faceplate to said frame.

4. The assembly of claim 1, wherein said frame is formed of a conductive material.

5. The assembly of claim 1, wherein said frame has a plurality of bevelled corners.

6. The assembly of claim 1, wherein each of the opposing ends of said frame has an attachable surface which is elevated from the front face of the frame by a selected distance, said attachable surface being substantially parallel to the frame.

7. The assembly of claim 1, wherein a portion of said top edge is folded at substantially a right angle with respect to said front face to provide enhanced structural rigidity.

8. The assembly of claim 7, wherein a portion of said bottom edge is folded at substantially a right angle with respect to said front face to provide enhanced structural rigidity.

9. A method for mounting an electrical box between two wall studs, comprising the steps of:
    attaching to the wall studs an elongated frame having a front face, a rear face, and a central cut-out portion defining a top edge and a bottom edge;
    placing an open front end of an electrical box flush against the rear face of said top and bottom edges;
    placing a faceplate against the front face of said top and bottom edges opposite and in alignment with the electrical box;

inserting a fastener through said cut-out portion;

sliding the electrical box and the faceplate along the length of said frame to place the electrical box and the faceplate at any desired position; and fastening the electrical box to the faceplate using said fastener to attach the electrical box and the faceplate to said frame at said desired location.

10. The method of claim 9, wherein the steps of placing the electrical box through fastening the electrical box are repeated to mount a plurality of electrical boxes onto a single frame between the two wall studs.

* * * * *